(12) United States Patent
Chapman, Jr.

(10) Patent No.: US 12,206,520 B1
(45) Date of Patent: Jan. 21, 2025

(54) DOMESTIC APPLIANCE COMMISSIONING

(71) Applicant: Haier US Appliance Solutions, Inc., Wilmington, DE (US)

(72) Inventor: John Gilman Chapman, Jr., Louisville, KY (US)

(73) Assignee: Haier US Appliance Solutions, Inc., Wilmington, DE (US)

( * ) Notice: Subject to any disclaimer, the term of this patent is extended or adjusted under 35 U.S.C. 154(b) by 0 days.

(21) Appl. No.: 18/342,460

(22) Filed: Jun. 27, 2023

(51) Int. Cl.
*H04L 61/5007* (2022.01)
*H04L 9/40* (2022.01)
*H04L 12/28* (2006.01)

(52) U.S. Cl.
CPC ...... *H04L 12/2807* (2013.01); *H04L 61/5007* (2022.05); *H04L 63/083* (2013.01)

(58) Field of Classification Search
CPC .......................... H04L 63/083; H04L 61/5007
USPC ......................................................... 709/222
See application file for complete search history.

(56) References Cited

U.S. PATENT DOCUMENTS

| 9,628,971 | B2 | 4/2017 | Salvador et al. |
| 9,992,677 | B2* | 6/2018 | Kim .................. H04L 63/08 |
| 10,742,621 | B2 | 8/2020 | Lancioni et al. |
| 2004/0111490 | A1* | 6/2004 | Im .................. H04L 69/40 714/2 |
| 2022/0256626 | A1 | 8/2022 | Yi et al. |

FOREIGN PATENT DOCUMENTS

| CN | 104363213 A | 2/2015 | |
| CN | 105376257 B | 2/2019 | |
| KR | 100902841 B1 | 6/2009 | |
| WO | WO-2018229935 A1 * | 12/2018 | ............ H04M 11/00 |
| WO | WO-2019182309 A1 * | 9/2019 | ......... H04L 12/2807 |

\* cited by examiner

*Primary Examiner* — Sibte H Bukhari
(74) *Attorney, Agent, or Firm* — Dority & Manning, P.A.

(57) ABSTRACT

A domestic appliance or method for commissioning the same may include features or steps for receiving an internet protocol (IP) address and an appliance identifier at a remote server spaced apart from the domestic appliance. Also included may be matching the received IP address to a stored IP address and determining a novel identifier as the received appliance identifier after matching the received IP address. Further included may be associating the received appliance identifier with the stored IP address after determining the received appliance identifier is novel identifier.

11 Claims, 5 Drawing Sheets

DOMESTIC APPLIANCE COMMISSIONING

FIELD OF THE INVENTION

The present subject matter relates generally to domestic appliances that can connect to a home network or a remote network, such as the internet; and more particularly, to improved commissioning of such appliances to a user account.

BACKGROUND OF THE INVENTION

Domestic (e.g., household) appliances are generally used for a variety of tasks by a variety of users. For example, a household may include such appliances as laundry appliances (e.g., a washing machine or dryer appliance), kitchen appliances (e.g., a refrigerator, a microwave, a coffee maker, user engagement device, etc.), along with room air conditioners and various other appliances.

Some domestic appliances can also include features for connecting to and communicating over a secure wireless network. Such communication may provide connected features on the domestic appliances to permit the domestic appliance to communicate with a personal device, smart home systems, or a remote database such as a cloud server.

Existing domestic appliances that can connect to a secure wireless network generally require multiple processes using multiple user interfaces in order to establish a connection or association, in particular an initial connection or association, between the domestic appliance and a user account. For instance, in order to commission an appliance, a user may be required to connect an existing device, such as a phone, to the appliance via a temporary connection while the user performs certain steps on the existing device. In order to maintain the security and integrity of the appliance, the temporary connection may be configured to automatically sever or close after a programmed amount of time. Nonetheless, some users, especially less-technologically-adept individuals, may have difficult performing the necessary processes and thus need more time to perform the processes.

Accordingly, there exists a need for an appliance that can be connected to a secured wireless network and added to a user account in an easier or more secure manner.

BRIEF DESCRIPTION OF THE INVENTION

Aspects and advantages of the invention will be set forth in part in the following description, or may be obvious from the description, or may be learned through practice of the invention.

In one exemplary aspect of the present disclosure, a method of commissioning a domestic appliance is provided. The method may include receiving an internet protocol (IP) address and an appliance identifier at a remote server spaced apart from the domestic appliance. The method may also include matching the received IP address to a stored IP address and determining a novel identifier as the received appliance identifier after matching the received IP address. The method may further include associating the received appliance identifier with the stored IP address after determining the received appliance identifier is novel identifier.

In another exemplary aspect of the present disclosure, a method of commissioning a domestic appliance is provided. The method may include establishing communication between the domestic appliance and a router having an internet protocol (IP) address. The method may also include presenting the IP address and an appliance identifier to a predetermined portal site subsequent to establishing communication and receiving the IP address and the appliance identifier at a remote server spaced apart from the domestic appliance. The method may further include matching the received IP address to a stored IP address within the remote server and determining a novel identifier as the received appliance identifier at the remote server after matching the received IP address. The method may still further include associating the received appliance identifier with the stored IP address at the remote server after determining the received appliance identifier is novel identifier.

In yet another exemplary aspect of the present disclosure, a domestic appliance is provided. The domestic appliance may include a cabinet, a user input, and a controller. The user input may be positioned on an exterior of the cabinet. The controller may be configured to initiate a commissioning operation. The commissioning operation may include establishing communication between the domestic appliance and a router having an internet protocol (IP) address, presenting the IP address and an appliance identifier to a predetermined portal site subsequent to establishing communication, and receiving the IP address and the appliance identifier at a remote server spaced apart from the domestic appliance.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures.

Figure 1:
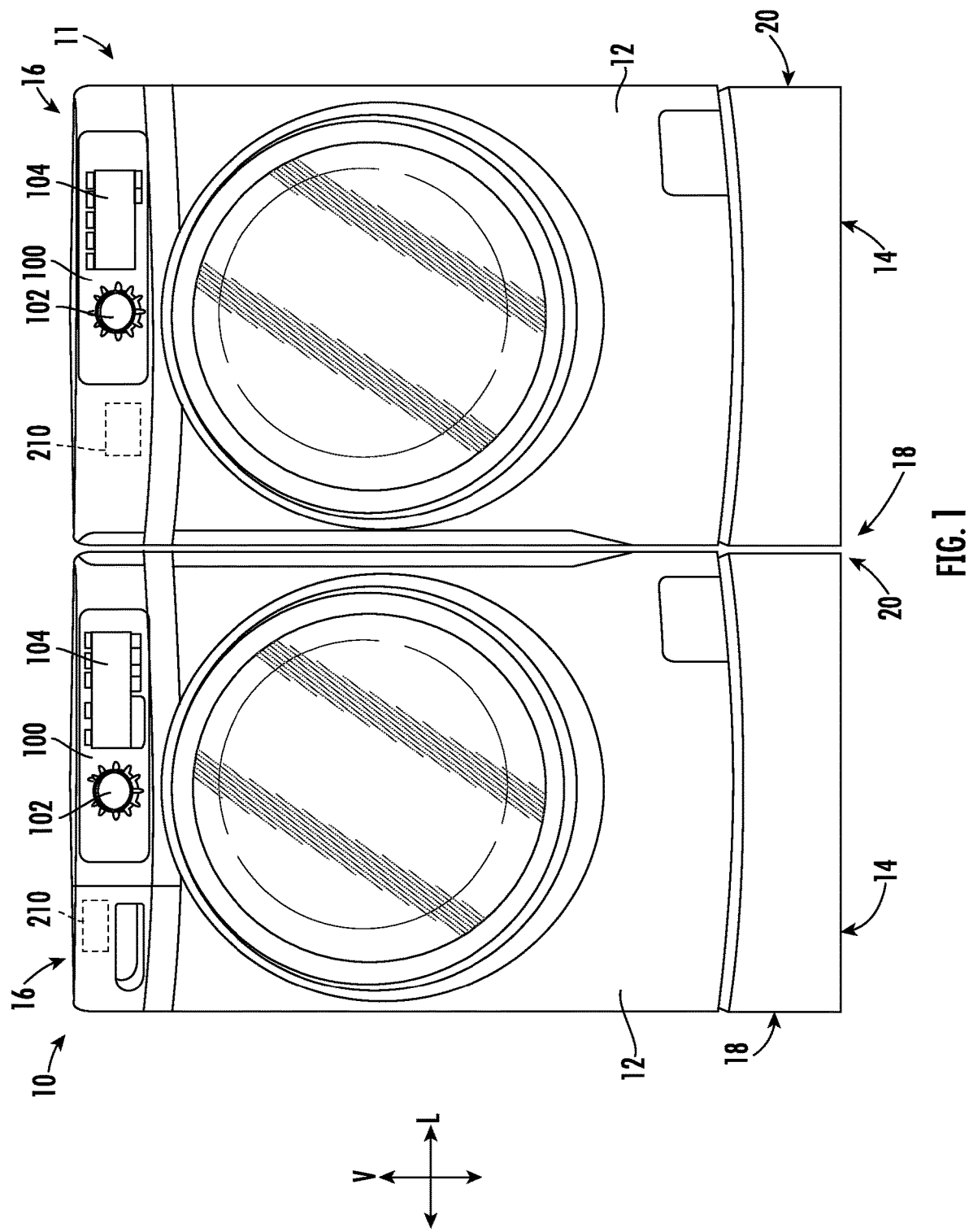
FIG. 1 provides a front, elevation view of laundry appliances in accordance with exemplary embodiments of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

As used herein, the terms "first," "second," and "third" may be used interchangeably to distinguish one component from another and are not intended to signify location or importance of the individual components. The terms "includes" and "including" are intended to be inclusive in a manner similar to the term "comprising." Similarly, the term "or" is generally intended to be inclusive (i.e., "A or B" is intended to mean "A or B or both"). In addition, here and throughout the specification and claims, range limitations may be combined or interchanged. Such ranges are identified and include all the sub-ranges contained therein unless context or language indicates otherwise. For example, all ranges disclosed herein are inclusive of the endpoints, and the endpoints are independently combinable with each other. The singular forms "a," "an," and "the" include plural references unless the context clearly dictates otherwise.

Approximating language, as used herein throughout the specification and claims, may be applied to modify any quantitative representation that could permissibly vary without resulting in a change in the basic function to which it is related. Accordingly, a value modified by a term or terms, such as "generally," "about," "approximately," and "substantially," are not to be limited to the precise value specified. In at least some instances, the approximating language may correspond to the precision of an instrument for measuring the value, or the precision of the methods or machines for constructing or manufacturing the components or systems. For example, the approximating language may refer to being within a 10 percent margin (i.e., including values within ten percent greater or less than the stated value). In this regard, for example, when used in the context of an angle or direction, such terms include within ten degrees greater or less than the stated angle or direction (e.g., "generally vertical" includes forming an angle of up to ten degrees in any direction, such as, clockwise or counterclockwise, with the vertical direction V).

The word "exemplary" is used herein to mean "serving as an example, instance, or illustration." In addition, references to "an embodiment" or "one embodiment" does not necessarily refer to the same embodiment, although it may. Any implementation described herein as "exemplary" or "an embodiment" is not necessarily to be construed as preferred or advantageous over other implementations. Moreover, each example is provided by way of explanation of the invention, not limitation of the invention. In fact, it will be apparent to those skilled in the art that various modifications and variations can be made in the present invention without departing from the scope of the invention. For instance, features illustrated or described as part of one embodiment can be used with another embodiment to yield a still further embodiment. Thus, it is intended that the present invention covers such modifications and variations as come within the scope of the appended claims and their equivalents.

Figure 2:
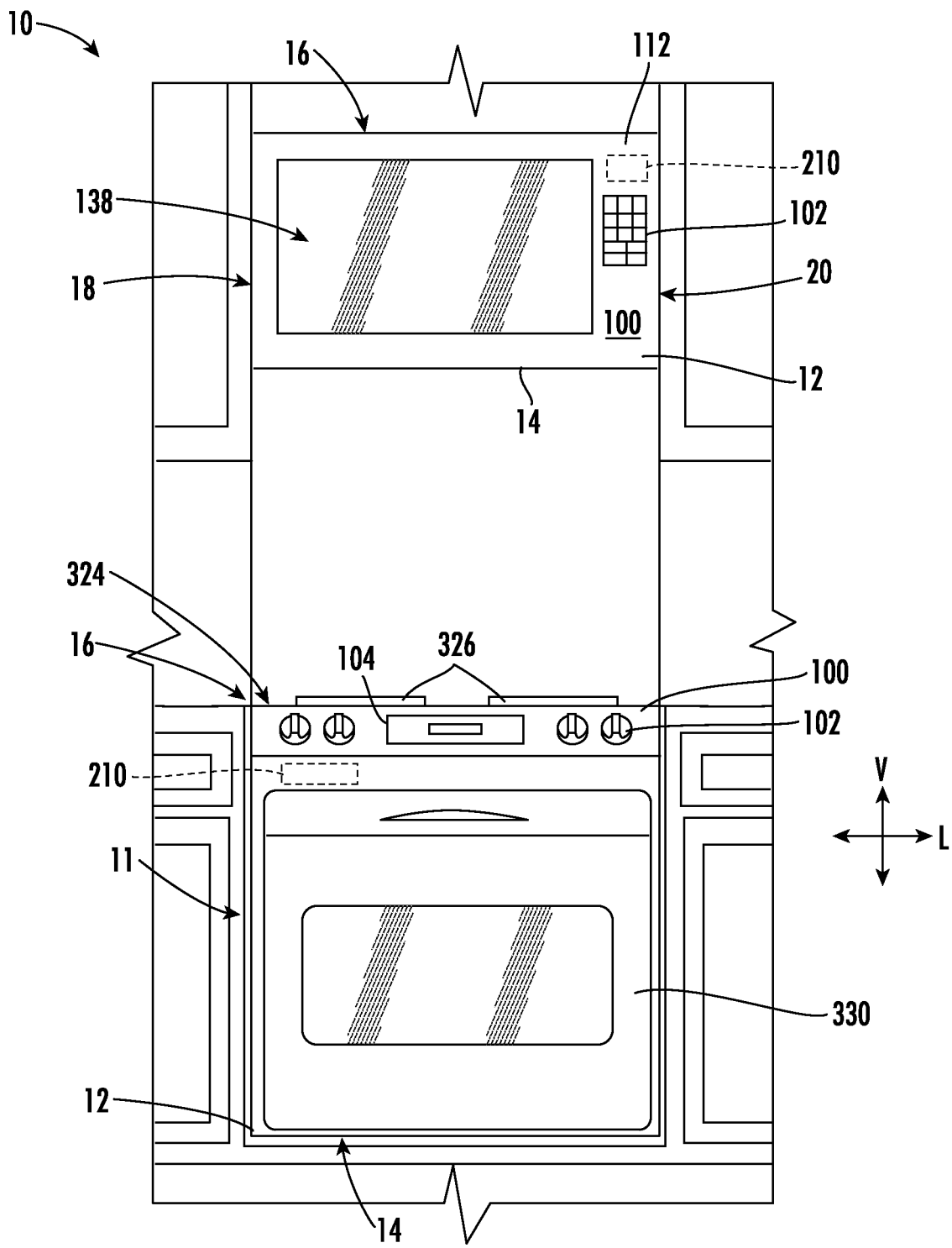
FIG. 2 provides a front, elevation view of kitchen appliances in accordance with exemplary embodiments of the present disclosure.

As may be seen in FIGS. 1 and 2, in accordance with one or more embodiments of the present disclosure, one or more appliances, such as a first appliance 10 and a second appliance 11, may be provided. The illustrated group of two appliances is provided by way of example only. Various embodiments of the present subject matter may also include only one or three or more appliances.

As generally shown throughout FIGS. 1 and 2, each appliance 10 and 11 includes a cabinet 12 that defines a vertical direction V, a lateral direction L, and a transverse direction T that are mutually perpendicular. Each cabinet 12 extends between a top side 16 and a bottom side 14 along the vertical direction V. Each cabinet 12 also extends between a left side 18 and a right side 20 (e.g., along the lateral direction L) and a front side 22 and a rear side 24 (e.g., along the transverse direction T).

Each appliance 10 and 11 may include a user interface panel 100 and a user input device 102, which may be positioned on an exterior of the cabinet 12. The user input device 102 is generally positioned proximate to the user interface panel 100, and in some embodiments, the user input device 102 is positioned on the user interface panel 100.

In various embodiments, the user interface panel 100 may represent a general purpose I/O ("GPIO") device or functional block. In some embodiments, the user interface panel 100 may include or be in operative communication with user input device 102, such as one or more of a variety of digital, analog, electrical, mechanical or electro-mechanical input devices including rotary dials, control knobs, push buttons, and touch pads. The user interface panel 100 may include a display component 104, such as a digital or analog display device designed to provide operational feedback to a user. The display component 104 may also be a touchscreen capable of receiving a user input, such that the display component 104 may also be a user input device in addition to or instead of the user input device 102.

Generally, one or more devices may include a controller 210. For instance, each appliance 10 and 11 may include a separate controller 210 in operative communication with the user input device 102. The user interface panel 100 and the user input device 102 may be in communication with the controller 210 via, for example, one or more signal lines or shared communication busses. Input/output ("I/O") signals may be routed between controller 210 and various operational components of the appliances 10 and 11. Operation of the appliances 10 and 11 may each be regulated by the respective controller 210 that is operatively coupled to the corresponding user interface panel 100. A user interface panel 100 may for example provide selections for user manipulation of the operation of an appliance (e.g., via user input device 102 or display 104). In response to user manipulation of the user interface panel 100 or user input device 102, the controller 210 may operate various components of the appliance 10 or 11. Each controller 210 may include a memory and one or more microprocessors, CPUs, or the like, such as general or special purpose microprocessors operable to execute programming instructions or microcontrol code associated with operation of the appliance 10 or 11. The memory may represent random access memory such as DRAM, or read only memory such as ROM or FLASH. In some embodiments, the processor executes programming instructions stored in memory. The memory may be a separate component from the processor or may be included onboard within the processor. Alternatively, a controller 210 may be constructed without using a microprocessor (e.g., using a combination of discrete analog or digital logic circuitry; such as switches, amplifiers, integrators, comparators, flip-flops, AND gates, and the like) to perform control functionality instead of relying upon software.

The controller 210 may be programmed to operate the respective device or appliance (e.g., 10 or 11) by executing instructions stored in memory. For example, the instructions may be software or any set of instructions that when executed by the processing device, cause the processing device to perform operations. Controller 210 can include one or more processor(s) and associated memory device(s) configured to perform a variety of computer-implemented functions or instructions (e.g. performing the methods, steps, calculations, etc. and storing relevant data, as disclosed herein). It should be noted that controllers 210 as disclosed herein are capable of, and may be operable to perform, any methods and associated method steps (e.g., as, or as part of, a commissioning operation) as disclosed herein.

In some embodiments, for example, as illustrated in FIG. 1, a pair of laundry appliances may be provided as the first appliance 10 and the second appliance 11. In the exemplary embodiment illustrated in FIG. 1, the first appliance 10 may be a washing machine appliance and the second appliance 11 may be a dryer appliance. In embodiments such as illustrated in FIG. 1, the user input device 102 of each appliance 10 and 11 may be positioned on the user interface panel 100. The embodiment illustrated in FIG. 1 also includes a display 104 on the user interface panel 100.

FIG. 2 illustrates another exemplary embodiment of a group of appliances where the first appliance 10 or the second appliance 11 is/are kitchen appliances. In this example, the first appliance 10 is a microwave oven appliance that is generally positioned above the second appliance 11, which is a cooktop appliance (e.g., along the vertical direction V).

Microwave oven appliance as first appliance 10 includes a cabinet 12. A cooking chamber is defined within the cabinet 12 of the microwave oven appliance. The cooking chamber is accessible via a door 112 and viewable through a window 138 in the door 112. The microwave oven appliance is configured to heat articles (e.g., food or beverages) within the cooking chamber using electromagnetic radiation. The microwave oven appliance may include various components that operate to produce the electromagnetic radiation, as is generally understood. For example, the microwave oven appliance may include a magnetron (such as, for example, a cavity magnetron), a high voltage transformer, a high voltage capacitor, and a high voltage diode. The transformer may provide energy from a suitable energy source (such as an electrical outlet) to the magnetron. The magnetron may convert the energy to electromagnetic radiation, specifically microwave radiation. The capacitor generally connects the magnetron and transformer, such as via high voltage diode, to a chassis. Microwave radiation produced by the magnetron may be transmitted through a waveguide to the cooking chamber. The structure and intended function of microwave ovens are generally understood by those of ordinary skill in the art and are not described in further detail herein.

As shown, cooktop appliance as second appliance 11 includes a chassis or cabinet 12 that extends along the vertical direction V between a top side 16 and a bottom side 14. The cooktop appliance can include a cooktop surface 324 having one or more heating elements 326 for use in, for example, heating or cooking operations. In exemplary embodiments, cooktop surface 324 is constructed with ceramic glass. In other embodiments, however, cooktop surface 324 may include any another suitable material, such as a metallic material (e.g., steel) or another suitable nonmetallic material. Heating elements 326 may be various sizes and may employ any suitable method for heating or cooking an object, such as a cooking utensil (not shown), and its contents. In one embodiment, for example, heating element 326 uses a heat transfer method, such as electric coils or gas burners, to heat the cooking utensil. In another embodiment, however, heating element 326 uses an induction heating method to heat the cooking utensil directly. In various embodiments, the heating elements 326 may include one or more of a gas burner element, resistive heat element, radiant heat element, induction element, or another suitable heating element.

In some embodiments, the cabinet 12 of the cooktop appliance may be insulated and may define a cooking chamber selectively enclosed by a door 330. One or more heating elements (e.g., top broiling elements or bottom baking elements) may be positioned within cabinet 12 of the cooktop appliance to heat the cooking chamber. Heating elements within the cooking chamber may be provided as any suitable element for cooking the contents of cooking chamber, such as an electric resistive heating element, a gas burner, a microwave element, a halogen element, etc. Thus, the cooktop appliance may be referred to as an oven range appliance. As will be understood by those skilled in the art, the cooktop appliance is provided by way of example only, and the present subject matter may be used in the context of any suitable cooking appliance, such as a double oven range appliance or a standalone cooktop (e.g., fitted integrally with a surface of a kitchen counter). Thus, the exemplary embodiments illustrated and described are not intended to limit the present disclosure to any particular cooking chamber or heating element configuration, unless explicitly indicated as such.

As illustrated, a user interface panel 100 may be provided on the cooktop appliance. Although shown at front portion of the cooktop appliance, another suitable location or structure (e.g., a backsplash) for supporting user interface panel 100 may be provided in alternative embodiments. In some embodiments, user interface panel 100 includes input components or controls 102, such as one or more of a variety of electrical, mechanical, or electro-mechanical input devices. Controls 102 may include, for example, rotary dials, knobs, push buttons, and touch pads. A controller 210 is in communication with user interface panel 100 and controls 102 through which a user may select various operational features and modes and monitor progress of the cooktop appliance. In additional or alternative embodiments, user interface panel 100 includes a display component, such as a digital or analog display in communication with a controller 210 and configured to provide operational feedback to a user. In certain embodiments, user interface panel 100 represents a general purpose I/O ("GPIO") device or functional block.

As shown, controller 210 is communicatively coupled (i.e., in operative communication) with user interface panel 100 and its controls 102. Controller 210 may also be communicatively coupled with various operational components of cooktop appliance 300 as well, such as heating elements (e.g., 326, 332), sensors, and the like. Input/output ("I/O") signals may be routed between controller 210 and the various operational components of the cooktop appliance. Thus, controller 210 can selectively activate and operate these various components. Various components of the cooktop appliance are communicatively coupled with controller 210 via one or more communication lines such as, for example, conductive signal lines, shared communication busses, or wireless communications bands.

According to various embodiments of the present disclosure, the appliances 10 or 11 may take the form of any of the examples described above, or may be any other domestic appliance where it is desired to have improved ease of commissioning (e.g., the process of adding a domestic appliance to a user account, which may include a list of appliances "commissioned" to that account or the IP address that each of those appliances uses to communicate to a remote server). Thus, it will be understood that the present subject matter is not limited to any particular domestic appliance and may include one or more laundry appliances (e.g., a washing machine or dryer appliance) or kitchen appliances (e.g., a refrigerator, a microwave, a coffee maker, user engagement system, etc.).

Figure 3:
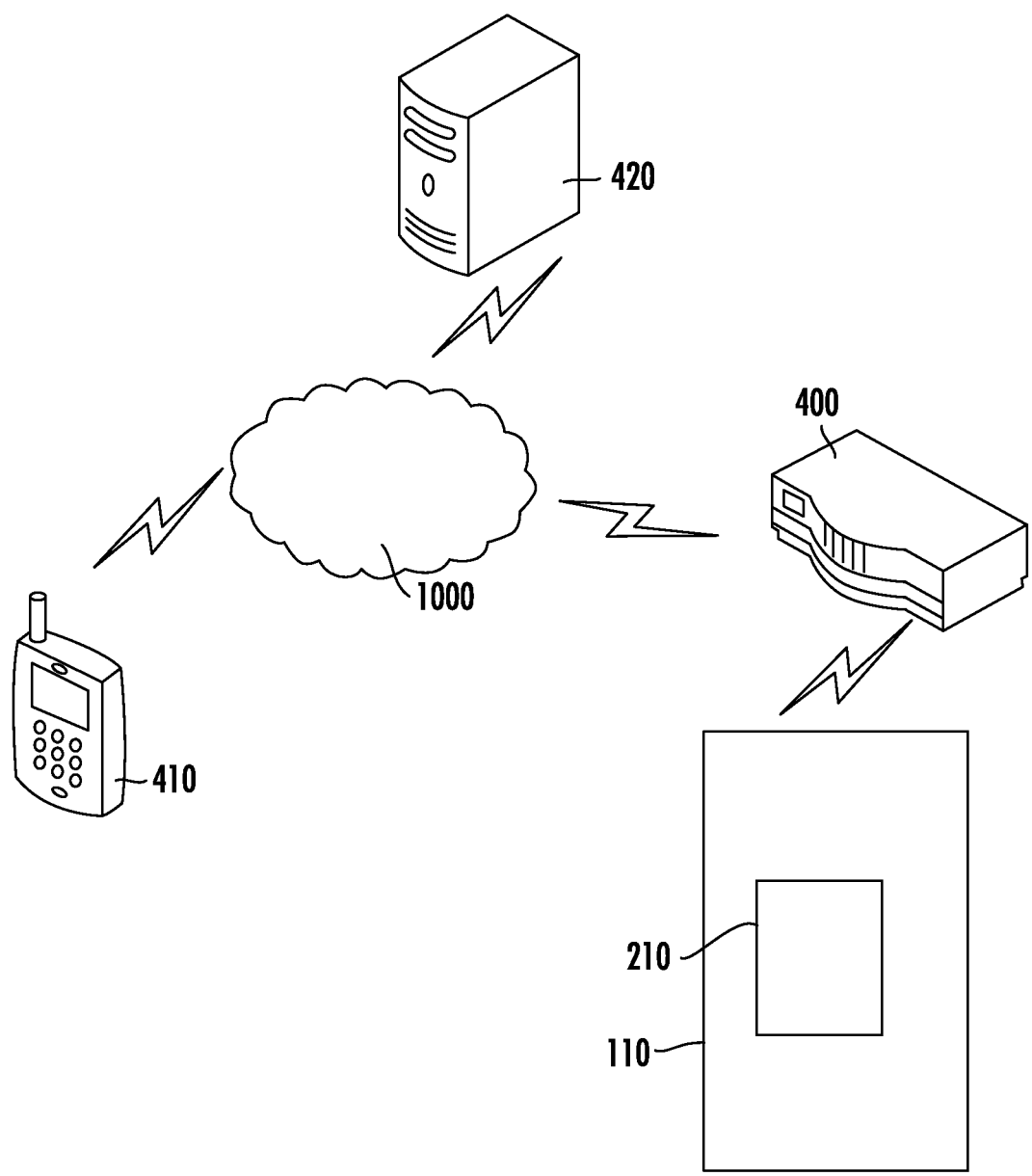
FIG. 3 provides a schematic view of an appliance being commissioned with a user device according to exemplary embodiments of the present disclosure.

Turning now especially to FIG. 3, an appliance 110 (e.g., first appliance 10 or second appliance 11-FIGS. 1 and 2) may be configured to communicate with one or more separate, external devices or appliances. For instance, controller 210 may be configured to communicate with a remote user interface device 410 or remote server 420, either directly or via one or more intermediate networks (e.g., a wide area network 1000, such as the internet). In some embodiments, the appliance 110 can access the wide area network 1000 via an access point, such as a modem or router 400, which may be part of a local, wireless network (e.g., WI-FI® or wireless network having a frequency between 1 GHz and 6 GHz).

The remote user interface device 410 may be a laptop computer, smartphone, tablet, personal computer, wearable device, smart home system, or various other suitable devices including a user interface (e.g., buttons or touchscreen display). In some embodiments, the remote user interface device 410 includes a controller having a memory (e.g., non-transitive storage media) for storing and retrieving programming instructions. For example, the remote user interface device 410 may be a smartphone operable to store and run applications (i.e., "apps") and may include a remote user interface provided as a smartphone app. During use, the appliance 110 may be in communication with the separate external device 410 or 420 through various possible communication connections and channels, such as but not limited to wireless radio frequency (RF) channels (e.g., ZIGBEE®, BLUETOOTH® WI-FI®, etc.) or any other suitable communication connection.

Methods and systems according to the present disclosure advantageously provide an easy or secure user experience when commissioning a new appliance 110). For example, commissioning the appliance 110 may include connecting the appliance 110 to a wireless (e.g., RF, WI-FI®, etc.) network or adding the appliance 110 to a user account on a remote server 420.

FIG. 3 provides a schematic view of appliance 110 (e.g., second appliance 11—FIGS. 1 and 2) communicating with a remote server 420, such as during a commissioning operation (e.g., for the first time). In particular, the remote server 420 (e.g., a controller 210 thereof) may communicate with the controller 210 of appliance 110 through a network interface on the controller 210, router 400, or network 1000. In some embodiments, commissioning of the new appliance 110 (e.g., commissioning operation) is initiated following or in response to receiving a network credential (e.g., a password for a local wireless network or router 400, which may be supplied to controller 210 directly by a user, such as from a user interface of appliance 110 or, alternatively indirectly, such as through device 410 or another appliance already connected to the network or router 400). Following the establishment of communication with the network or router 400, the appliance 110 may submit or request a predetermined portal site (e.g., web address), which may correspond to a site hosted (at least in part) on remote server 420. Included with or following the request to the predetermined portal site may be an internet protocol (IP) address or an appliance identifier. For instance, the IP address may be provided from the router (e.g., as a programmed IP address, as is generally understood). Additionally or alternatively, the appliance identifier may include a serial number, device-model descriptor (e.g., model name, number, etc.), or media access control (MAC) address, which may be programmed or stored within the controller 210 of appliance 110 (e.g., at the network interface thereof).

After communication is established, the remote server 420 may receive the IP address or appliance identifier and attempt to match either or both within a stored database (e.g., user-account database including a plurality of discrete user accounts with which one or more existing appliances may be associated). The appliance 110 may be identified as being uncommissioned (e.g., not associated with any user account or listed within a corresponding appliance list). Optionally, the IP address may be matched to a stored IP address (e.g., associated with a particular user account). Thus, it may be determined that a device or appliance (e.g., first appliance) has previously communicated with remote server 420 or otherwise been stored within the remote server 420 (e.g., such as to identify an address from which an appliance for the particular user account has used).

If the appliance 110 has not previously communicated with the remote server 420 (or otherwise been identified or stored within a database of the remote server 420), the appliance identifier may be determined to be a novel identifier. For instance, the remote server 420 may determine that the appliance identifier has not previously been matched to the IP address (e.g., stored IP address) or associated with the particular user account. Optionally, a confirmation request may be sent (e.g., from the remote server 420) to the appliance 110 or to a previously associated device (e.g., first appliance or remote user device 410), and a responsive confirmation signal may be received or required (e.g., before proceeding or storing the appliance identifier). Such a confirmation signal may be sent from the new appliance 110 or the previously associated device, though the confirmation signal may originate at an appliance/device that is the same or different from the appliance/device to which the confirmation request was sent. It is noted that if a user does not wish to commission the new appliance to the particular account associated with the matched IP address, a denial signal may be optionally transmitted from the new appliance 110 or the previously associated device or, alternatively, the general absence of a confirmation signal (e.g., within a predetermined time-out period) may cause the appliance identifier of the new appliance 110 to not be associated with the appliance (e.g., to effectuate a commission denial).

Eventually, the appliance identifier may be associated with the stored IP address or remote server. Going forward, the appliance 110 may be commissioned and associated with the particular user account.

Figure 4:
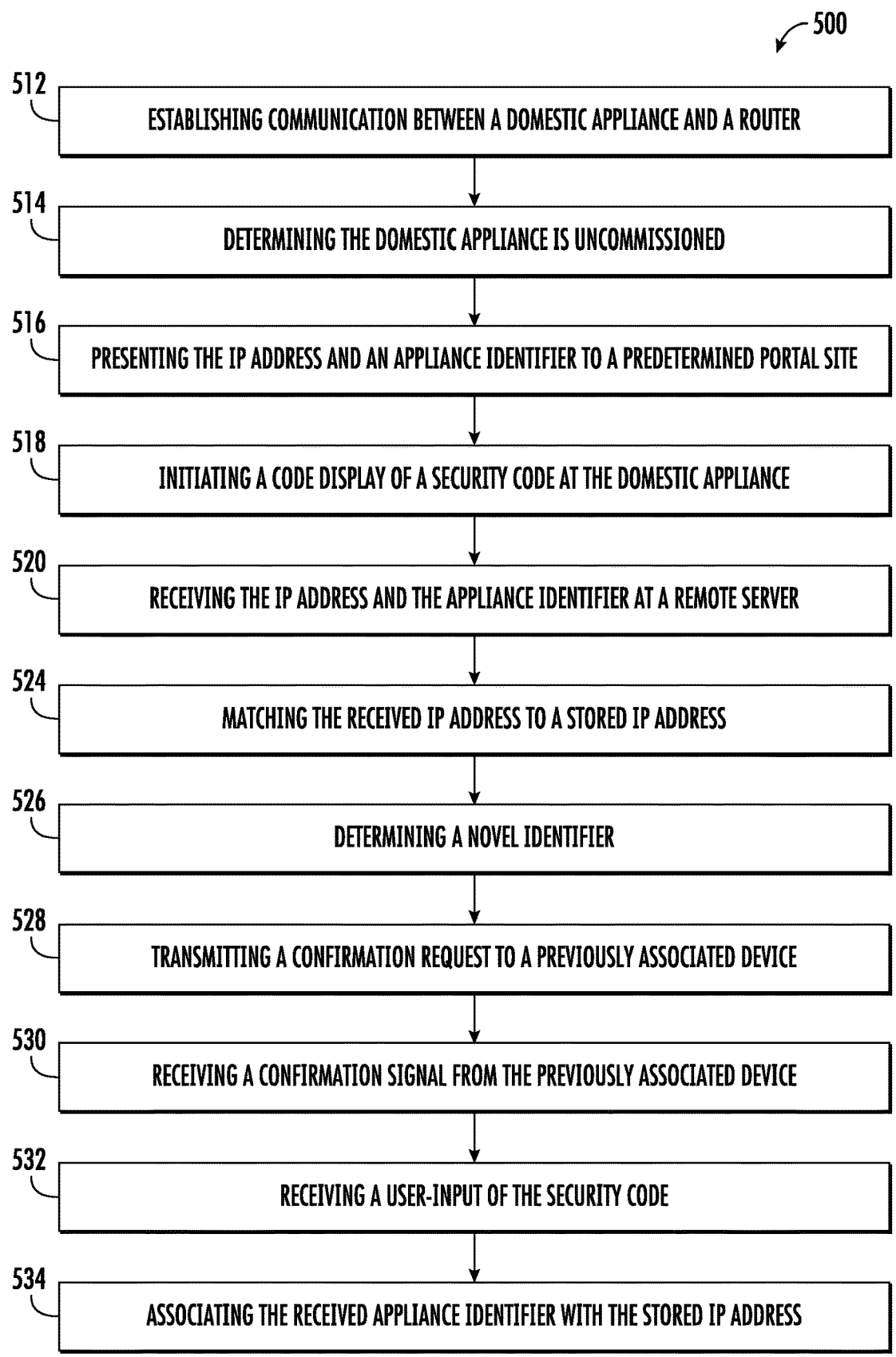
FIG. 4 provides a flow chart illustrating a method of commissioning an appliance according to exemplary embodiments of the present disclosure.

Turning now to FIG. 4, various methods may be provided for use of a system, appliance (e.g., second appliance 11 or new appliance 110), or remote server (e.g., remote server 420) in accordance with the present disclosure. In general, the various steps of methods (e.g., method 500 or method 600) as disclosed herein may, in exemplary embodiments, be performed by one or more controllers 210 (e.g., of second appliance 11, new appliance 110, or remote server 420) as part of an operation that a controller 210 is configured to execute (e.g., as, or as part of, a commissioning operation). During such methods, the controller 210 may receive inputs and transmit outputs from various other components or external devices. In particular, the present disclosure is further directed to methods, such as commissioning a domestic appliance (e.g., second appliance 11).

Figure 5:
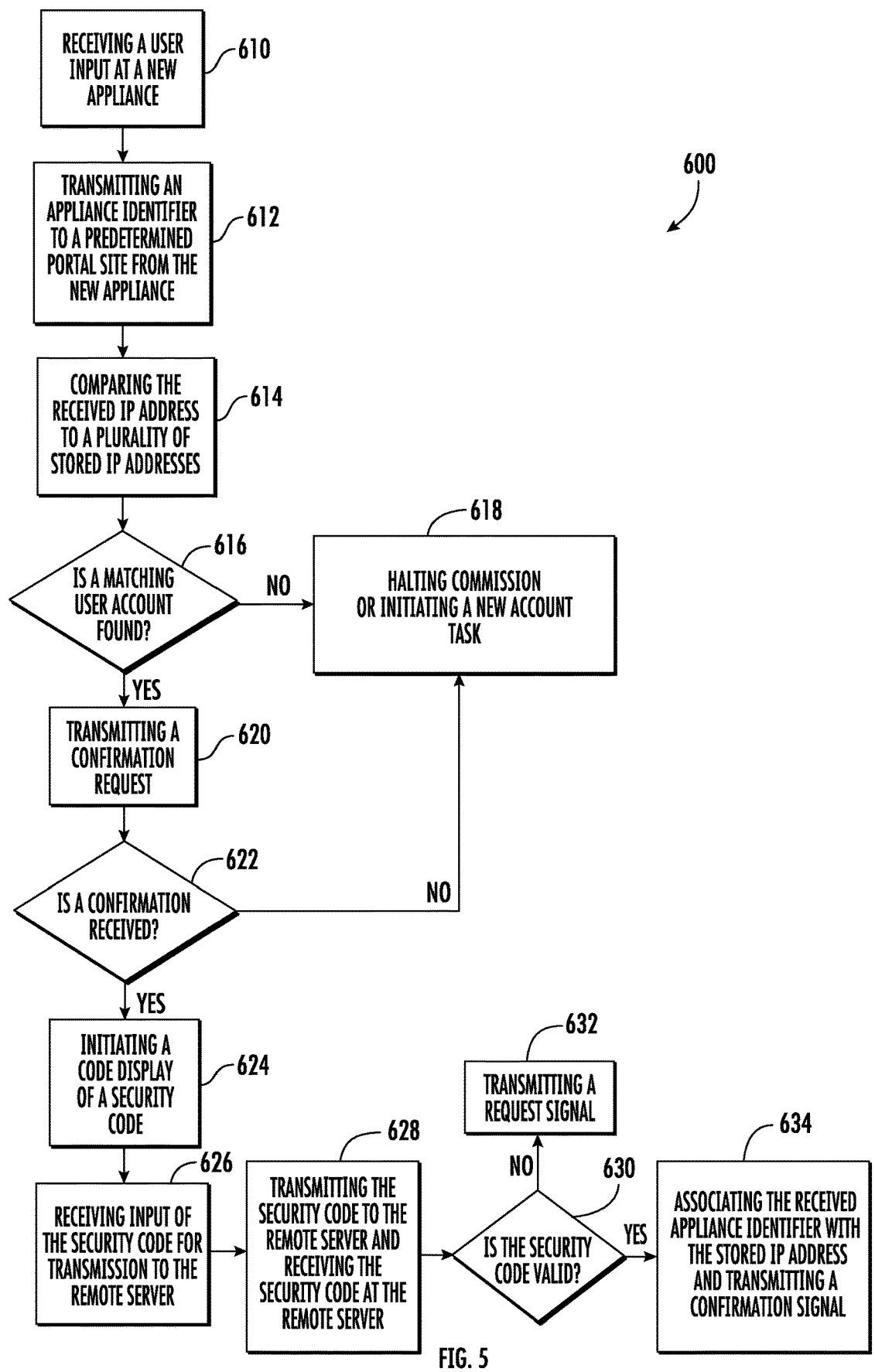
FIG. 5 provides a flow chart illustrating a method of commissioning an appliance according to exemplary embodiments of the present disclosure.

FIGS. 4 and 5 depicts steps performed in a particular order for purpose of illustration and discussion. Those of ordinary skill in the art, using the disclosures provided herein, will understand that the methods are not mutually exclusive and steps of any of the methods disclosed herein can be modified, adapted, rearranged, omitted, or expanded in various ways without deviating from the scope of the present disclosure, except as otherwise indicated. In certain embodiments, such methods may advantageously facilitate associating an appliance to a user account in an easy and secure manner.

Turning especially to FIG. 4, at 512, the method 500 includes establishing communication between the domestic appliance and a router having an internet protocol (IP) address (e.g., programmed within the router). For instance, as would be understood, the router may establish a local (e.g., WI-FI®) network and be connected to a separate wide area network (e.g., the internet), such as via a separate or integrated modem. Moreover, the router may have a programed service set identifier (SSID), which is detectable at the domestic appliance and which a user may select (e.g., at the user interface of the domestic appliance). As is further understood, a network credential for the router may be required to connect the domestic appliance and router. Such a network credential may be directly input at the domestic appliance (e.g., by a user at the user interface of the domestic appliance) or supplied from a separate device (e.g., a remote user device or previously commissioned appliance).

At 514, the method 500 includes determining the domestic appliance is uncommissioned. In some embodiments, a controller includes a memory slot or field to generally indicate the commission state (e.g., commissioned or, alternately, uncommissioned). For instance, if the domestic appliance is uncommissioned, the corresponding memory slot or field may be blank (e.g., as a null value) or otherwise programmed to indicate the uncommisioned commission state. In optional embodiments, the determination is made in response to a commission inquiry in which the controller is prompted to evaluate the memory slot or field for the commission state. Such an inquiry may be made, for instance, in response to 512.

At 516, the method 500 includes presenting the IP address and an appliance identifier to a predetermined portal site (e.g., subsequent or in response to 512). For instance, through the router, the domestic appliance may request and load the predetermined portal site, which may be a programmed website or internet address. Optionally, 516 may be in response to 514. Thus, after determining the domestic appliance is uncommissioned, the predetermined portal site may be requested in order to permit presentation of the IP address of the router and the appliance identifier of the domestic appliance. Generally, the IP address may be programmed within the router. In turn, communications to the predetermined portal site from or through the router may include the IP address. The appliance identifier may include a serial number, device-model descriptor (e.g., model name, number, etc.), or media access control (MAC) address.

At 518, the method 500 includes initiating a code display of a security code (e.g., at the domestic appliance or a previously associated device. Optionally, the security code may be displayed at a user interface prior to one or more subsequent steps, such as 532, described below. Such a code may be a randomized or predetermined number, character string, etc. locally generated or stored within the domestic appliance. Moreover, the security code may further uniquely identify the domestic appliance or the matched user account. Optionally, the security code may be shared with another device or submitted to the predetermined portal site (e.g., with or as part of 516).

At 520, the method 500 includes receiving the IP address of the router and appliance identifier (e.g., from the domestic appliance). For instance, a remote server may host the predetermined portal site to which the IP address and appliance identifier are presented (e.g., at 516). Thus, the IP address of the router and appliance identifier of the domestic appliance may be received by the remote server. As noted above, the appliance identifier may include a MAC address of the domestic appliance. Additionally or alternatively, the appliance identifier may include a device-model descriptor (e.g., model name, number, etc.) of the domestic appliance, such that descriptive information or data regarding the particular model or unit of the domestic appliance may be provided with or as the appliance identifier. Further additionally or alternatively, the appliance identifier may include a serial number of the domestic appliance (e.g., numbering or otherwise labeling the particular appliance unit).

Once loaded, the IP address of the router and the appliance identifier of the domestic appliance may be presented and evaluated (e.g., at the remote server).

At 522, the method 500 includes matching the received IP address to a stored IP address. Specifically, following or in response to 520, the method 500 may provide for a match to be made between the received IP address of 520 and an IP address that is stored apart from the domestic appliance or router (e.g., stored within the remote server). For instance, the received IP address may be compared to a plurality of stored IP addresses, each of which is associated with one or more discrete user accounts. In particular, the remote server may have a stored-IP-address list (i.e., list of stored IP addresses that have been previously matched with different user accounts or appliances). Such user accounts may have one or more existing appliances that have already been associated with a specific user account (i.e., previously associated domestic appliances). Thus, the remote server may readily identify or "know" what IP address a particular user or user account will make use of in order to access the remote server. Moreover, the remote server may identify that the received IP address matches an IP address from which the remote server has previously associated with an individual user account (or user accounts).

At 524, the method 500 includes determining a novel identifier (e.g., relative to the stored IP address) as the received appliance identifier after 524. In other words, the received appliance identifier from 520 may be determined to be a novel identifier and, thus, no previously associated with a stored user account. In some such embodiments, 524 include comparing the received appliance identifier to a corresponding appliance list (e.g., linked or correlated with the stored-IP-address list). Specifically, the corresponding device list may include one or more device entries for one or more device previously associated with the stored IP address of 522.

At 526, the method 500 includes transmitting a confirmation request to a previously associated device (e.g., in response to 524). For instance, the remote server may transmit the confirmation request to one or more devices or appliances (e.g., remote user device or other domestic appliance) that have previously been associated with the received IP address (or corresponding user account). At such devices, the confirmation request may initiate a window or dialog screen (or other input prompt) that generally encourages a user to confirm or deny that the new domestic appliance is intended to be associated with the same user account as the previously associated device.

At 528, the method 500 includes receiving a confirmation signal from the previously associated device (e.g., following 526). For instance, in response to a user input (e.g., to indicate that the user intends to associate the new domestic appliance with the same user account), the previously associated device may transmit the confirmation signal (e.g., through one or more networks), which may then be received by the remote server.

At 530, the method 500 includes receiving a user-input of the security code at the remote server (e.g., separate from, following, or with 528). Generally, 530 may follow 518. For instance, a user may input the security code at a previously associated device in order to confirm that the user is in proximity with the new domestic appliance and is able to view the security code. The received user-input may then be transmitted (e.g., through one or more networks) to and received by the remote server, as would be understood. At the remote server, the received security code may then be matched to the security code displayed at the new domestic appliance.

At 532, the method 500 includes associating the received appliance identifier with the stored IP address (or corresponding user account). Specifically, 532 may follow or be dependent on 524 or 528. Optionally, 532 may be contingent on 530. As an associated device, the new domestic appliance may be commissioned to the same user account as the previously associated device(s) and, thereby, available to communicate with the remote server (e.g., to exchange alert or command signals therewith), as would be understood in light of the present disclosure. In particular, a confirmation signal may be transmitted from the remote server or otherwise received by the new appliance, and the confirmation signal may initiate or prompt a confirmation alert (e.g., audible sound or visible image, light, message, or display) generated at the user interface at the new domestic appliance.

Turning especially to FIG. 5, at 610, the method 600 includes receiving a user input at a new appliance. The user input may be a simple as activating or powering on the new appliance. Additionally or alternatively, a user-input command may be required at the new domestic appliance. Further additionally or alternatively, the new domestic appliance may receive user inputs or commands to connect to a wireless network (e.g., via a router), as would be understood in light of the present disclosure.

At 612, the method 600 includes transmitting an appliance identifier to a predetermined portal site from the new appliance (e.g., following or in response to 610). For instance, through the router, the new domestic appliance may request and load the predetermined portal site, which may be a programmed website or internet address. Generally, the IP address may be programmed within the router. In turn, communications to the predetermined portal site from or through the router may include the IP address. The appliance identifier may include a serial number, device-model descriptor (e.g., model name, number, etc.), or media access control (MAC) address.

At 614, the method 600 includes comparing the received IP address to a plurality of stored IP addresses (e.g., at the remote server hosting the portal site). Thus, the IP address of the router and appliance identifier of the domestic appliance may be received by the remote server and compared to a plurality of stored IP addresses, each of which is associated with one or more discrete user accounts. In particular, the remote server may have a stored-IP-address list (i.e., list of stored IP addresses that have been previously matched with different user accounts or appliances). Such user accounts may have one or more existing appliances that have already been associated with a specific user account (i.e., previously associated domestic appliances). Thus, the remote server may readily identify or "know" what IP address a particular user or user account will make use of in order to access the remote server.

At 616, the method 600 includes evaluating the comparison results following 614. Specifically, the remote server may identify if the received IP address matches an IP address from which the remote server has previously associated with an individual user account (or user accounts). If a match is not made, the method 600 may proceed to 618. By contrast, if a match is made, the method 600 may proceed directly to 620.

At 618, the method 600 includes halting commission or initiating a new-account task. In other words, the method 600 may be halted. Additionally or alternatively, the remote server may transmit one or more prompt signals (e.g., to the new appliance or another device) to initiate generation of a message generally suggest or guide a user to creating a new account to be associated with the new appliance.

At 620, the method 600 includes transmitting a confirmation request. The confirmation request may be transmitted to the new appliance or to one or more previously associated devices. For instance, the remote server may transmit the confirmation request to one or more devices or appliances (e.g., remote user device or other domestic appliance) that have previously been associated with the received IP address (or corresponding user account). At such devices, the confirmation request may initiate a window or dialog screen (or other input prompt) that generally encourages a user to confirm or deny that the new domestic appliance is intended to be associated with the same user account as the previously associated device.

At 622, the method 600 includes evaluating a confirmation signal. Specifically, it may be determined if an affirmative confirmation response has been received (e.g., at the remote server from the new domestic appliance or a previously associated device) following 620. If no affirmative confirmation response is received, the method 600 may proceed to 618, as described above. By contrast, if an affirmative confirmation response is received, the method 600 may proceed to 624.

At 624, the method 600 includes initiating a code display of a security code (e.g., following 622). Specifically, the security code may be displayed at a user interface of the new appliance or a previously associated device. Such a code may be a randomized or predetermined number, character string, etc. locally generated or stored within the domestic appliance. Moreover, the security code may further uniquely identify the domestic appliance or the matched user account.

At 626, the method 600 includes receiving an input of the security code for transmission to the remote server (e.g., following 624). For instance, the security code may be manually input at the new appliance or one or more previously associated appliances. The device on which the user inputs the security code may be different from the device on which the security code is displayed at 624.

At 628, the method 600 includes transmitting the security code to the remote server (e.g., from the device on which it is input at 626) and receiving the security code at the remote server.

At 630, the method 600 includes evaluating the received security code to ensure the received security code from 628 matches the displayed code at 624. If the security codes do not match, the method 600 may proceed to 632. By contrast, if the codes match, the method 600 may proceed to 634.

At 632, the method 600 includes transmitting a request signal. Specifically, the request signal at 632 may be configured to initiate generation of a message generally suggest or guide a retrying the commissioning process or otherwise notify the user that the process has been unsuccessful.

At 634, the method 600 includes associating the received appliance identifier with the stored IP address. As an associated device, the new domestic appliance may be commissioned to the same user account as the previously associated device(s) and, thereby, available to communicate with the remote server (e.g., to exchange alert or command signals therewith), as would be understood in light of the present disclosure. In particular, a confirmation signal may be transmitted from the remote server or otherwise received by the new appliance, and the confirmation signal may initiate or prompt a confirmation alert (e.g., audible sound or visible image, light, message, or display) generated at the user interface at the new domestic appliance.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method of commissioning a domestic appliance, the method comprising:
   establishing communication between the domestic appliance and a router having an internet protocol (IP) address;
   presenting the IP address and an appliance identifier to a predetermined portal site subsequent to establishing communication;
   receiving the IP address and the appliance identifier at a remote server spaced apart from the domestic appliance;
   matching the received IP address to a stored IP address within the remote server;
   determining a novel identifier as the received appliance identifier at the remote server after matching the received IP address;
   associating the received appliance identifier with the stored IP address at the remote server after determining the received appliance identifier is novel identifier; and
   determining the domestic appliance is uncommissioned, wherein presenting the IP address and the appliance identifier to the predetermined portal site is in response to determining the domestic appliance is uncommissioned.

2. The method of claim 1, further comprising:
   transmitting a confirmation request to a previously associated device in response to matching the received IP address; and
   receiving a confirmation signal from the previously associated device following the confirmation request.

3. The method of claim 1, further comprising:
   initiating a code display of a security code at the domestic appliance prior to associating the received appliance identifier;
   receiving a user-input of the security code at the remote server following initiating the code display, wherein associating the received appliance identifier is contingent on receiving the user-input.

4. The method of claim 1, wherein the appliance identifier comprises a MAC address of the domestic appliance.

5. The method of claim 1, wherein the appliance identifier comprises a device-model descriptor.

6. The method of claim 1, wherein the appliance identifier comprises a serial number of the domestic appliance.

7. The method of claim 1, wherein determining the novel identifier comprises comparing the received appliance identifier to a corresponding appliance list, the corresponding device list comprising one or more device entries for one or more device previously associated with the stored IP address.

8. A domestic appliance comprising:
   a cabinet;
   a user input positioned on an exterior of the cabinet; and
   a controller comprising a processor and a memory, the controller being configured to initiate a commissioning operation, the commissioning operation comprising establishing communication between the domestic appliance and a router having an internet protocol (IP) address,
   presenting the IP address and an appliance identifier to a predetermined portal site subsequent to establishing communication,
   receiving the IP address and the appliance identifier at a remote server spaced apart from the domestic appliance,
   matching the received IP address to a stored IP address within the remote server, determining a novel identifier as the received appliance identifier at the remote server after matching the received IP address,
   associating the received appliance identifier with the stored IP address at the remote server after determining the received appliance identifier is novel identifier, and
   determining the domestic appliance is uncommissioned, wherein presenting the IP address and the appliance identifier to the predetermined portal site is in response to determining the domestic appliance is uncommissioned.

9. The domestic appliance of claim 8, wherein the appliance identifier comprises a MAC address of the domestic appliance.

10. The domestic appliance of claim 8, wherein the appliance identifier comprises a device-model descriptor.

11. The domestic appliance of claim 8, wherein the appliance identifier comprises a serial number of the domestic appliance.

* * * * *